(12) United States Patent  (10) Patent No.: US 8,629,680 B2
Fu et al.  (45) Date of Patent: Jan. 14, 2014

(54) CENTRAL PROCESSING UNIT TEST SYSTEM

(75) Inventors: Ying-Bin Fu, Shenzhen (CN); Ting Ge, Shenzhen (CN); Ya-Jun Pan, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 342 days.

(21) Appl. No.: 13/239,417

(22) Filed: Sep. 22, 2011

(65) Prior Publication Data

US 2013/0055024 A1 Feb. 28, 2013

(30) Foreign Application Priority Data

Aug. 29, 2011 (CN) .......................... 2011 1 0250804

(51) Int. Cl.
*G01R 31/00* (2006.01)
*G06F 11/26* (2006.01)

(52) U.S. Cl.
USPC ........................................... 324/500; 714/30

(58) Field of Classification Search
None
See application file for complete search history.

(56) References Cited

U.S. PATENT DOCUMENTS

| | | | | |
|---|---|---|---|---|
| 5,225,775 A | * | 7/1993 | Sekino | 324/762.02 |
| 6,331,770 B1 | * | 12/2001 | Sugamori | 324/750.3 |
| 6,900,627 B2 | * | 5/2005 | Mori et al. | 324/756.07 |
| 7,478,290 B2 | * | 1/2009 | Co et al. | 714/718 |

\* cited by examiner

*Primary Examiner* — Vinh Nguyen
(74) *Attorney, Agent, or Firm* — Altis Law Group, Inc.

(57) ABSTRACT

A central processing unit (CPU) test system includes a CPU socket, a CPU core controller, and a CPU test device. The CPU core controller stores a start voltage message. The CPU test device includes a voltage detection pin, an analog to digital (A/D) converter, and a microcontroller. The voltage detection pin detects a voltage of an electronic device connected to the CPU socket. The A/D converter converts the detected voltage into a digital signal. The microcontroller controls the CPU core controller to output the start voltage to the CPU socket according to the digital signal. The microcontroller stores a predetermined start voltage message. The microcontroller reads the start voltage message after controlling the CPU core controller to output the start voltage, and determines whether the CPU core controller supplies the start voltage to the CPU socket by comparing the read start voltage message with the predetermined start voltage message.

8 Claims, 3 Drawing Sheets

CENTRAL PROCESSING UNIT TEST SYSTEM

BACKGROUND

1. Technical Field

The present disclosure relates to test systems, and particularly, to a central processing unit (CPU) test system.

2. Description of Related Art

Some platforms released by INTEL require motherboard manufacturers to set start voltages of CPU sockets on motherboards. Therefore, it is unnecessary to test whether CPU core controllers of the motherboards, supply voltages to the CPU sockets. Other platforms released by INTEL do not require the motherboard manufactures to set start voltages to the CPU sockets. Therefore, it is necessary for the motherboard manufacturers to test whether the CPU core controllers on the motherboards supply voltages to the CPU sockets. When CPUs inserted in the CPU sockets transmit voltage requiring signals to the CPU core controllers, the CPU core controllers output a start voltage to the CPUs through the corresponding CPU sockets. However, during testing, the CPUs are not inserted into the CPU sockets. There is no CPU to transmit a voltage requiring a signal to the CPU core controllers to drive the CPU core controllers to output start voltages to the corresponding CPU sockets, thus there is no way to test whether the CPU core controllers supply start voltages to the corresponding CPU sockets.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawing, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
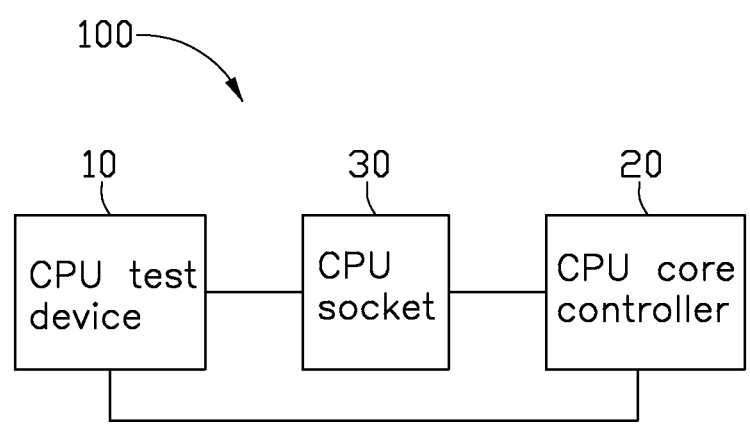
FIG. 1 is a block diagram of an embodiment of a central processing unit (CPU) test system, wherein the CPU test system includes a CPU test device and a CPU core controller.

Referring to FIG. 1, an embodiment of a central processing unit (CPU) test system 100 includes a CPU test device 10, a CPU core controller 20, and a CPU socket 30. The CPU core controller 20 is connected to the CPU test device 10. The CPU socket 30 is connected between the CPU test device 10 and the CPU core controller 20.

Figure 2:
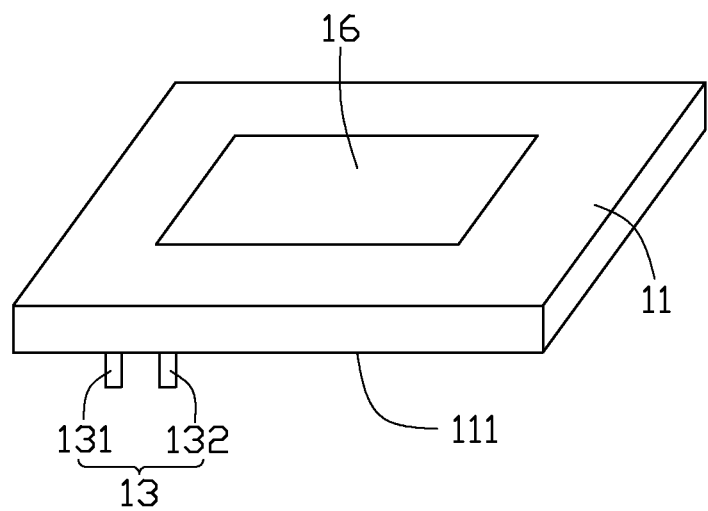
FIG. 2 is a schematic view of an embodiment of the test device of FIG. 1.
Figure 3:
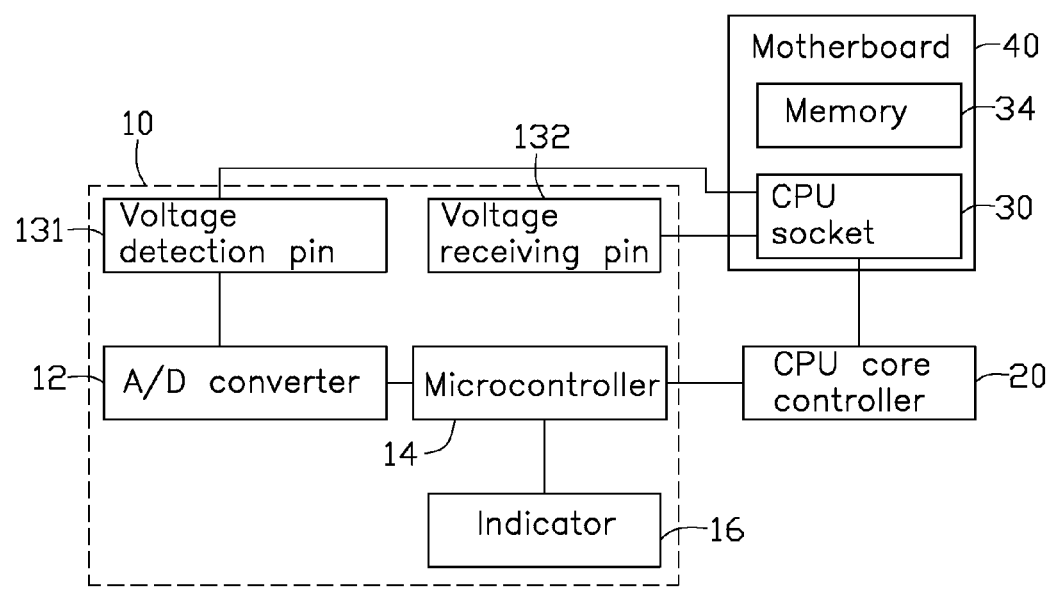
FIG. 3 is a block diagram of the CPU test device communicating with the CPU core controller of FIG. 1.

Referring to FIGS. 2 and 3, the CPU test device 10 includes an enclosure 11 and a plurality of pins 13 mounted on a bottom 111 of the enclosure 11. The enclosure 11 is substantially rectangular, similar to a shape of a CPU. The CPU socket 30 includes a plurality of pins, corresponding to the pins 13. The arrangement of the pins 13 corresponds to the arrangement of the pins of the CPU socket 30, to allow the pins 13 of the CPU test device 10 to be inserted into the CPU socket 30 to communicate with the CPU core controller 20. The CPU test device 10 further includes an analog to digital (A/D) converter 12, a microcontroller 14, and an indicator 16. The A/D converter 12 and the microcontroller 14 are mounted in the enclosure 11 of the CPU test device 10. The indicator 16 is mounted on the enclosure 11. The pins 13 include a voltage detection pin 131 and a voltage receiving pin 132.

The CPU socket 30 is also connected to another electronic device, such as memory 34 of a motherboard 40, through transmission lines. The pin connected to the memory 34 of the CPU socket 30 corresponds to the voltage detection pin 131. The voltage detection pin 131 detects a voltage of the memory 34 through the CPU socket 30 to determine whether the motherboard 40 is powered on. When the voltage detection pin 131 detects the voltage of the memory 34 through the CPU socket 30, it denotes that the motherboard 40 is powered on. When the voltage detection pin 131 fails to detect the voltage of the memory 34, it denotes that the motherboard 40 is not powered on. The A/D converter 12 is connected to the voltage detection pin 131 of the CPU test device 10. The A/D converter 12 is also connected to the microcontroller 14. The microcontroller 14 is connected to the CPU core controller 20. The voltage receiving pin 132 is connected to the CPU core controller 20 through the CPU socket 30. The CPU core controller 20 outputs a start voltage to the CPU socket 30.

In test, the CPU test device 10 is inserted into the CPU socket 30. The voltage detection pin 131 is connected to the memory 34 through the corresponding pin of the CPU socket 30 to detect the voltage of the memory 34. The voltage receive pin 132 is connected to the CPU core controller 20 through the CPU socket 30. When the voltage detection pin 131 detects the voltage of the memory 34, the voltage detection pin 131 outputs the voltage to the A/D converter 12. The A/D convertor 12 converts the voltage into a digital signal and outputs the digital signal to the microcontroller 14. The microcontroller 14 controls the CPU core controller 20 to output the start voltage to the voltage receiving pin 132 through the CPU socket 30 after receiving the digital signal.

The CPU core controller 20 stores an output voltage address. Start voltage message is stored in the output voltage address. The microcontroller 14 stores a predetermined start voltage message. The microcontroller 14 reads the start voltage message stored in the output voltage address after controlling the CPU core controller 20 to output the start voltage, compares the read start voltage message with the predetermined start voltage message. If the read start voltage message and the predetermined start voltage message are the same or a difference between the read start voltage message and the predetermined start voltage message is in a predetermined range, it denotes that the CPU core controller 20 can supply the start voltage to the CPU socket 30 after the motherboard 40 is powered on. If the difference between the read start voltage message and the predetermined start voltage message is outside of the predetermined range, it denotes that the CPU core controller 20 cannot supply the start voltage to the CPU socket 30 after the motherboard 40 is powered on. The microcontroller 14 starts the indicator 16 to indicate that the CPU core controller 20 cannot supply the start voltage to the CPU socket 30 after the motherboard 40 is powered on.

In the embodiment, the indicator 16 is a light emitting diode. In another embodiment, the indicator 16 can be a speaker.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A central processing unit (CPU) test device to determine whether a CPU core controller of a motherboard can supply a start voltage to a CPU socket mounted on the motherboard, the CPU test device comprising:
   a voltage detection pin to be connected to the CPU socket to detect a voltage of an electronic device connected to the CPU socket to determine whether the motherboard mounting the CPU socket is powered on;
   an analog to digital (A/D) converter connected to the voltage detection pin to receive the detected voltage and convert the detected voltage into a digital signal; and
   a microcontroller connected to the A/D converter to receive the digital signal to control the CPU core controller to output the start voltage to the CPU socket according to the digital signal;
   wherein the microcontroller stores a predetermined start voltage message, the microcontroller reads a start voltage message stored in the CPU core controller after controlling the CPU core controller to output the start voltage, and determines whether the CPU core controller supplies the start voltage to the CPU socket through comparing the read start voltage message with the predetermined start voltage message.

2. The CPU test device of claim 1, further comprising an enclosure, the voltage detection pin is mounted on a bottom of the enclosure to be inserted into the CPU socket, the A/D converter and the microcontroller are mounted in the enclosure.

3. The CPU test device of claim 1, further comprising a voltage receiving pin, wherein when the CPU test device is inserted into the CPU socket, the voltage receiving pin is connected to the CPU core controller through the CPU socket to receive the start voltage from the CPU core controller.

4. The CPU test device of claim 1, further comprising an indicator connected to the microcontroller, wherein if the CPU core controller fails to supply the start voltage to the CPU socket, the microcontroller starts the indicator.

5. A central processing unit (CPU) test system comprising:
   a CPU socket;
   a CPU core controller to supply a start voltage to the CPU socket, wherein the CPU core controller stores a start voltage message; and
   a CPU test device connected to the CPU core controller, and inserted into the CPU socket, the CPU test device comprising:
      a voltage detection pin to be connected to the CPU socket to detect a voltage of an electronic device connected to the CPU socket to determine whether a motherboard mounting the CPU socket is powered on;
      an analog to digital (A/D) converter connected to the voltage detection pin to receive the detected voltage and convert the detected voltage into a digital signal; and
      a microcontroller connected to the A/D converter to receive the digital signal to control the CPU core controller to output the start voltage to the CPU socket according to the digital signal;
   wherein the microcontroller stores a predetermined start voltage message, the microcontroller reads the start voltage message stored in the CPU core controller after controlling the CPU core controller to output the start voltage, and determines whether the CPU core controller supplies the start voltage to the CPU socket through comparing the read start voltage message with the predetermined start voltage message.

6. The CPU test system of claim 5, wherein the CPU test device further comprises an enclosure, the voltage detection pin is mounted on a bottom of the enclosure to be inserted into the CPU socket, the A/D converter and the microcontroller are mounted in the enclosure.

7. The CPU test system of claim 5, wherein the CPU test device further comprises a voltage receiving pin, when the CPU test device is inserted into the CPU socket, the voltage receiving pin is connected to the CPU core controller through the CPU socket to receive the start voltage from the CPU core controller.

8. The CPU test system of claim 5, wherein the CPU test device further comprises an indicator connected to the microcontroller, if the CPU core controller fails to supply the start voltage to the CPU socket, the microcontroller starts the indicator.

* * * * *